United States Patent
Xie

(10) Patent No.: US 10,919,282 B1
(45) Date of Patent: Feb. 16, 2021

(54) FLEXIBLE DISPLAY MODULE AND FLEXIBLE DISPLAY DEVICE

(71) Applicant: WUHAN CHINA STAR OPTOELECTRONICS SEMICONDUCTOR DISPLAY TECHNOLOGY CO., LTD., Hubei (CN)

(72) Inventor: Ming Xie, Hubei (CN)

(73) Assignee: WUHAN CHINA STAR OPTOELECTRONICS SEMICONDUCTOR DISPLAY TECHNOLOGY CO., LTD., Hubei (CN)

(*) Notice: Subject to any disclaimer, the term of this patent is extended or adjusted under 35 U.S.C. 154(b) by 0 days.

(21) Appl. No.: 16/638,764

(22) PCT Filed: Dec. 5, 2019

(86) PCT No.: PCT/CN2019/123241
§ 371 (c)(1),
(2) Date: Feb. 13, 2020

(51) Int. Cl.
*G02F 1/1333* (2006.01)
*B32B 37/12* (2006.01)
*G02F 1/1335* (2006.01)
*G06F 1/16* (2006.01)

(52) U.S. Cl.
CPC ...... *B32B 37/1284* (2013.01); *G02F 1/13338* (2013.01); *G02F 1/133528* (2013.01); *G06F 1/1652* (2013.01); *B32B 2307/42* (2013.01); *B32B 2309/105* (2013.01); *B32B 2457/208* (2013.01)

(58) Field of Classification Search
CPC ........................ G02F 1/13476; G02F 1/13338
See application file for complete search history.

(56) References Cited

U.S. PATENT DOCUMENTS

| 2016/0002501 | A1* | 1/2016 | Niiyama | B32B 27/32 428/189 |
| 2017/0323779 | A1* | 11/2017 | Um | H01L 27/1262 |
| 2019/0061318 | A1* | 2/2019 | Jung | H01L 27/32 |

* cited by examiner

*Primary Examiner* — Edmond C Lau
(74) *Attorney, Agent, or Firm* — Mark M. Friedman

(57) ABSTRACT

The present application provides a flexible display module including a touch panel and a polarizer. The polarizer is disposed on the touch panel and connected to the touch panel by a first optical adhesive layer. The first optical adhesive layer includes an uncured optical adhesive in a bending region and a cured optical adhesive in a non-bending region.

8 Claims, 2 Drawing Sheets

FLEXIBLE DISPLAY MODULE AND FLEXIBLE DISPLAY DEVICE

CROSS-REFERENCE TO RELATED APPLICATIONS

This application claims priority to Chinese patent application No. 201910754463.X, titled "FLEXIBLE DISPLAY MODULE AND FLEXIBLE DISPLAY DEVICE" and filed on Aug. 15, 2019 with the China National Intellectual Property Administration, which is incorporated by reference in the present application in its entirety.

FIELD OF APPLICATION

The present application is related to the field of display technology, and specifically to a flexible display module and a flexible display device.

BACKGROUND OF APPLICATION

With rapid development of display technology, flexible displays have attracted much attention. Flexible panels with foldable features have become a developing trend of smartphones. Reducing an overall thickness of a product and increasing bending resistance of the product can be taken into consideration to improve bending performance of the smartphones.

Currently, optical adhesives are used to attach polarizers to other materials. The optical adhesives are classified into two types. One is an uncured type, which does not generate gas, is easy to be cut, and has good bending resistance, but its fluidity and adhesive ability are relatively poor. The other is a cured type, which has good adhesion and fluidity, but the bending resistance is reduced after being cured by ultraviolet light, making its overall structural strength lower.

In summary, the optical adhesives are adopted to attach the polarizers of flexible display modules in the prior art to other materials. If cured optical adhesives are adopted, the bending performance is poor after curing. If uncured optical adhesives are adopted, the adhesion is poor. Therefore, it is necessary to improve these defects.

SUMMARY OF APPLICATION

Polarizers of flexible display modules in the prior art adopt the optical adhesives to adhere to other materials. If cured optical adhesives are adopted, bending performance is poor after curing. If uncured optical adhesives are adopted, an adhesion is poor.

In order to solve the above question, the present application provides technical solutions as follows.

The present application provides a flexible display module including a touch panel and a polarizer. The polarizer is disposed on the touch panel and is connected to the touch panel by a first optical adhesive layer. The first optical adhesive layer includes an uncured optical adhesive in a bending region and a cured optical adhesive in a non-bending region.

In the flexible display module provided by an embodiment of the present application, a thickness of the first optical adhesive layer ranges from 30 to 40 microns.

In the flexible display module provided by an embodiment of the present application, material of the uncured optical adhesive includes poly(methyl methacrylate).

In the flexible display module provided by an embodiment of the present application, material of the cured optical adhesive includes epoxy acrylate.

In the flexible display module provided by an embodiment of the present application, the touch panel further includes a display panel and a touch functional layer disposed on the display panel.

In the flexible display module provided by an embodiment of the present application, the display panel is disposed on a side of the touch panel away from the polarizer. The display panel includes a backplate, a light-emitting layer disposed on the backplate, and a thin film encapsulation layer disposed on the light-emitting layer. The touch functional layer is connected to the thin film encapsulation layer.

The present application provides a flexible display device including a touch panel, a polarizer, and a cover plate. The polarizer is disposed on the touch panel and is connected to the touch panel by a first optical adhesive layer. The cover plate is disposed on the polarizer and is connected to the polarizer by a second optical adhesive. At least one of the first optical adhesive layer or the second optical adhesive layer includes an uncured optical adhesive in a bending region and a cured optical adhesive in a non-bending region.

In the flexible display device provided by an embodiment of the present application, material of the uncured optical adhesive includes poly(methyl methacrylate).

In the flexible display device provided by an embodiment of the present application, material of the cured optical adhesive includes epoxy acrylate.

In the flexible display device provided by an embodiment of the present application, the first optical adhesive layer and the second optical adhesive layer both include the uncured optical adhesive in the bending region and the cured optical adhesive in the non-bending region.

In the flexible display device provided by an embodiment of the present application, a width of the uncured optical adhesive of the first optical adhesive layer is less than a width of the uncured optical adhesive of the second optical adhesive layer.

In the flexible display device provided by an embodiment of the present application, a thickness of the first optical adhesive layer ranges from 30 to 40 microns.

In the flexible display device provided by an embodiment of the present application, a thickness of the second optical adhesive layer ranges from 30 to 40 microns.

In the flexible display device provided by an embodiment of the present application, a thickness of the first optical adhesive layer is equal to the thickness of the second optical adhesive layer.

In the flexible display device provided by an embodiment of the present application, the touch panel further includes a display panel and a touch functional layer disposed on the display panel.

In the flexible display device provided by an embodiment of the present application, the display panel is disposed on a side of the touch panel away from the polarizer. The display panel includes a backplate, a light-emitting layer disposed on the backplate, and a thin film encapsulation layer disposed on the light-emitting layer. The touch functional layer is connected to the thin film encapsulation layer.

Compared to the prior art, the flexible display module provided by an embodiment of the present application features a full-surface optical adhesive layer design that provides the uncured optical adhesive in the bending region and the cured optical adhesive in the non-bending region. After the optical adhesives are attached, it satisfies not only the bending performance of the flexible display module, achieving high strength of the bending region but also adhesion performance of an entire surface, achieving adhesion stability of the non-bending region.

DETAILED DESCRIPTION OF PREFERRED EMBODIMENTS

The present application provides a flexible display module and a flexible display device. In order to make purposes, technical solutions, and effects of the present application clearer and more specific, the present application is further described in detail below with reference to the accompanying drawings and examples. It should be understood that the specific embodiments described herein are only used to explain the application, and are not used to limit the present application.

Figure 1:
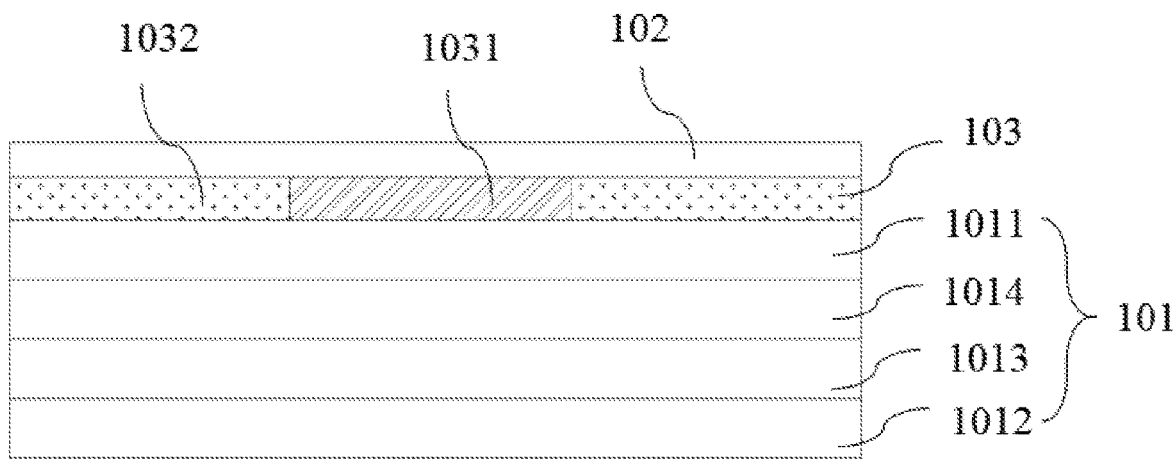
FIG. 1 is a basic structural diagram of a flexible display module provided by an embodiment of the present application.

Please refer to FIG. 1, which is a basic structural diagram of a flexible display module provided by an embodiment of the present application. Components of the present application and relative positional relationships between the components can be seen intuitively from the drawing. The flexible display module includes a touch panel 101 and a polarizer 102. The polarizer 102 is disposed on the touch panel 101 and is connected to the touch panel 101 by a first optical adhesive layer 103. The first optical adhesive layer 103 includes an uncured optical adhesive 1031 in a bending region and a cured optical adhesive 1032 in a non-bending region. A full-surface optical adhesive 103 provided by an embodiment of the present application is the uncured optical adhesive 1031 in the bending region and is the cured optical adhesive 1032 in the non-bending region, which not only can satisfy excellent bending performance of the bending region, but also can increase adhesion stability of the non-bending region. The structure is simple and is suitable for mass production.

Specifically, material of the uncured optical adhesive 1031 includes poly(methyl methacrylate). The uncured optical adhesive 1031 does not generate gas during an attaching process, is easy to be cut, and has good bending resistance, which not only satisfies bending performance of a flexible product but also achieves high strength of the bending region of the flexible product. Material of the cured optical adhesive 1032 includes epoxy acrylate. The cured optical adhesive 1032 has good adhesion and fluidity, which not only satisfies adhesion performance of an entire surface of the flexible product but also achieves adhesion stability of the non-bending region of the flexible product.

In an embodiment, a thickness of the first optical adhesive layer 103 ranges from 30 to 40 microns. The touch panel 101 further includes a display panel and a touch functional layer 1011 disposed on the display panel. The display panel is disposed on a side of the touch panel 101 away from the polarizer 102. The display panel includes a backplate 1012, a light-emitting layer 1013 disposed on the backplate 1012, and a thin film encapsulation layer 1014 disposed on the light-emitting layer 1013. The touch functional layer 1011 is connected to the thin film encapsulation layer 1014.

In an embodiment, the touch function layer 1011 is directly patterned on the thin film encapsulation layer 1014 from a touch circuit. Compared to the prior art, removal of the thin film substrate makes the flexible product thinner, that is, a thickness of the flexible product is reduced.

In an embodiment, the flexible display module has more than one bending region. For example, the flexible display module includes two bending regions and three non-bending regions, and each bending region and each non-bending region are disposed alternately. Bending directions of the bending regions are not limited. Two of them may be bent in a same direction or may be bent in an opposite direction, which depends on performance required to achieve a final product.

The present application provides a flexible display device. The flexible display device includes a touch panel, a polarizer, and a cover plate. The polarizer is disposed on the touch panel and is connected to the touch panel by a first optical adhesive layer. The cover plate is disposed on the polarizer and is connected to the polarizer by a second optical adhesive. At least one of the first optical adhesive layer or the second optical adhesive layer includes an uncured optical adhesive in a bending region and a cured optical adhesive in a non-bending region.

Specifically, material of the uncured optical adhesive includes poly(methyl methacrylate). The uncured optical adhesive does not generate gas during an attaching process, is easy to be cut, and has good bending resistance, which not only satisfies bending performance of a flexible product but also achieves high strength of the bending region of the flexible product. Material of the cured optical adhesive includes epoxy acrylate. The cured optical adhesive has good adhesion and fluidity, which not only satisfies adhesion performance of an entire surface of the flexible product but also achieves adhesion stability of the non-bending region of the flexible product.

It should be explained that a meaning of that at least one of the first optical adhesive layer or the second optical adhesive layer includes the uncured optical adhesive in the bending region and the cured optical adhesive in the non-bending region is: the first optical adhesive layer is the uncured optical adhesive in the bending region and is the cured optical adhesive in the non-bending region, and the second optical adhesive layer is not limited; or the second optical adhesive layer is the uncured optical adhesive in the bending region and is the cured optical adhesive in the non-bending region, and the first optical adhesive layer is not limited; or the first optical adhesive layer and the second optical adhesive layer both include the uncured optical adhesive in the bending region and the cured optical adhesive in the non-bending region.

In an embodiment, thicknesses of the first optical adhesive layer and the second optical adhesive layer range from 30 to 40 microns.

In an embodiment, the thickness of the first optical adhesive layer is equal to the thickness of the second optical adhesive layer.

Figure 2:
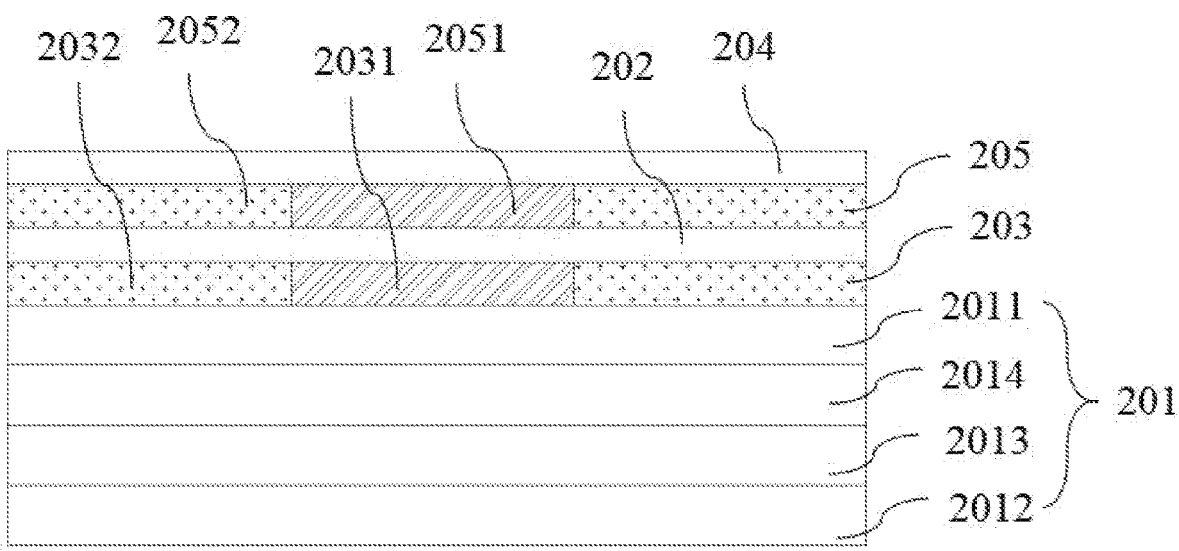
FIG. 2 is a basic structural diagram of a flexible display device provided by an embodiment of the present application.

In an embodiment, please refer to FIG. 2, which is a basic structural diagram of the flexible display device provided by an embodiment of the present application. Components of the present application and relative positional relationships between the components can be seen intuitively from the drawing. The flexible display device includes the touch panel 201, the polarizer 202, and the cover plate 204. The polarizer 202 is disposed on the touch panel 201 and is connected to the touch panel 201 by the first optical adhesive layer 203. The cover plate 204 is disposed on the polarizer 202 and is connected to the polarizer 202 by the second optical adhesive 205. The first optical adhesive layer 203 and the second optical adhesive layer 205 both include the uncured optical adhesive in the bending region and the cured optical adhesive in the non-bending region.

In an embodiment, the first optical adhesive layer 203 includes the uncured optical adhesive 2031 in the bending region and the cured optical adhesive 2032 in the non-bending region. The second optical adhesive layer 205 includes the uncured optical adhesive 2051 in the bending region and the cured optical adhesive 2052 in the non-bending region. A width of the uncured optical adhesive 2031 is equal to a width of the uncured optical adhesive 2051. A width of the cured optical adhesive 2032 is equal to a width of the cured optical adhesive 2052.

In an embodiment, the touch panel 201 further includes a display panel and a touch functional layer 2011 disposed on the display panel. The display panel is disposed on a side of the touch panel 201 away from the polarizer 202. The display panel includes a backplate 2012, a light-emitting layer 2013 disposed on the backplate 2012, and a thin film encapsulation layer 2014 disposed on the light-emitting layer 2013. The touch functional layer 2011 is connected to the thin film encapsulation layer 2014.

In an embodiment, the touch function layer 2011 is directly patterned on the thin film encapsulation layer 2014 from a touch circuit. Compared to the prior art, removal of the thin film substrate makes the flexible product thinner, that is, a thickness of the flexible product is reduced.

In an embodiment, the flexible display device has more than one bending region. For example, the flexible display device includes two bending regions and three non-bending regions, and each bending region and each non-bending region are disposed alternately. Bending directions of the bending regions are not limited. Two of them may be bent in a same direction or may be bent in an opposite direction, which depends on performance required to achieve a final product.

Figure 3:
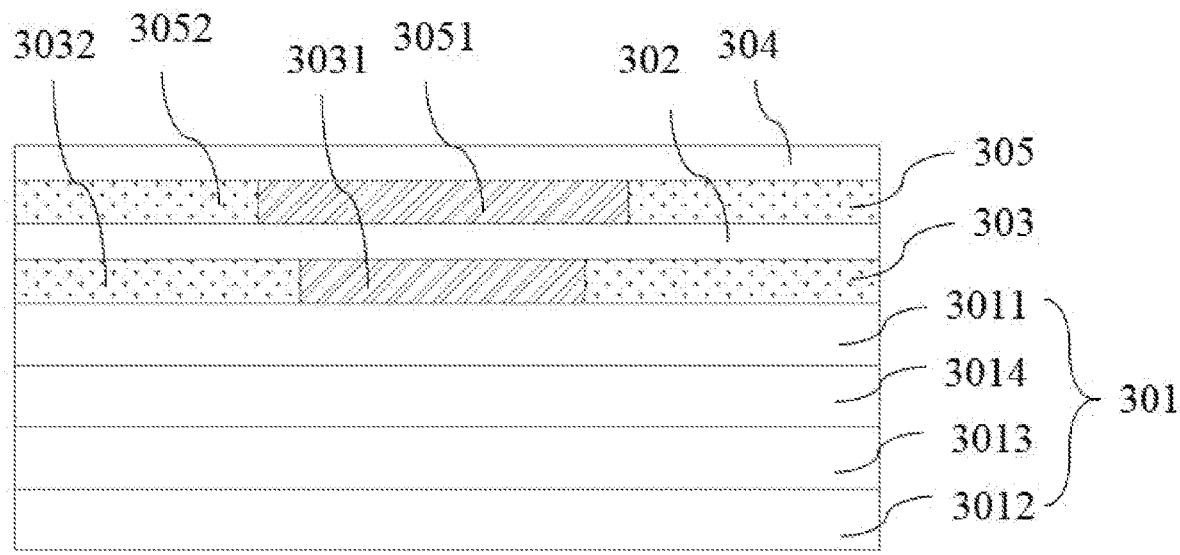
FIG. 3 is another basic structural diagram of the flexible display device provided by an embodiment of the present application.

Please refer to FIG. 3, which is another basic structural diagram of the flexible display device provided by an embodiment of the present application. Components of the present application and relative positional relationships between the components can be seen intuitively from the drawing. The flexible display device includes a touch panel 301, a polarizer 302, and a cover plate 304. The polarizer 302 is disposed on the touch panel 301 and is connected to the touch panel 301 by a first optical adhesive layer 303. The cover plate 304 is disposed on the polarizer 302 and is connected to the polarizer 302 by a second optical adhesive 305. The first optical adhesive layer 303 and the second optical adhesive layer 305 both include an uncured optical adhesive in a bending region and a cured optical adhesive in a non-bending region. A width of the uncured optical adhesive 3031 of the first optical adhesive layer 303 is less than a width of the uncured optical adhesive 3051 of the second optical adhesive layer 305.

In an embodiment, a width of the cured optical adhesive 3032 of the first optical adhesive layer 303 is greater than a width of the cured optical adhesive 3052 of the second optical adhesive layer 305.

Specifically, during a bending process, a side of the flexible display device near the cover plate 304 is subjected to a tensile force, and a side of the flexible display device near the touch panel 301 is subjected to a compressive force. In this embodiment, the first optical adhesive layer 303 is attached to a side of the polarizer 302 near the touch panel 301, the second optical adhesive 305 is attached to a side of the polarizer 302 near the cover plate 304, and the width of the uncured optical adhesive 3031 of the first optical adhesive layer 303 is less than the width of the uncured optical adhesive 3051 of the second optical adhesive layer 305, which not only can satisfy excellent adhesion performance of the polarizer but also can satisfy excellent bending performance of the polarizer. The width of the uncured optical adhesive 3031 is less than the width of the uncured optical adhesive 3051, which can relieve the tensile force on an upper surface and the compressive force on a lower surface of the polarizer 302.

In an embodiment, the touch panel 301 further includes a display panel and a touch functional layer 3011 disposed on the display panel. The display panel is disposed on a side of the touch panel 301 away from the polarizer 302. The display panel includes a backplate 3012, a light-emitting layer 3013 disposed on the backplate 3012, and a thin film encapsulation layer 3014 disposed on the light-emitting layer 3013. The touch functional layer 3011 is connected to the thin film encapsulation layer 3014.

In an embodiment, the touch function layer 3011 is directly patterned on the thin film encapsulation layer 2014 from a touch circuit. Compared to the prior art, removal of the thin film substrate makes the flexible product thinner, that is, a thickness of the flexible product is reduced.

Figure 4:
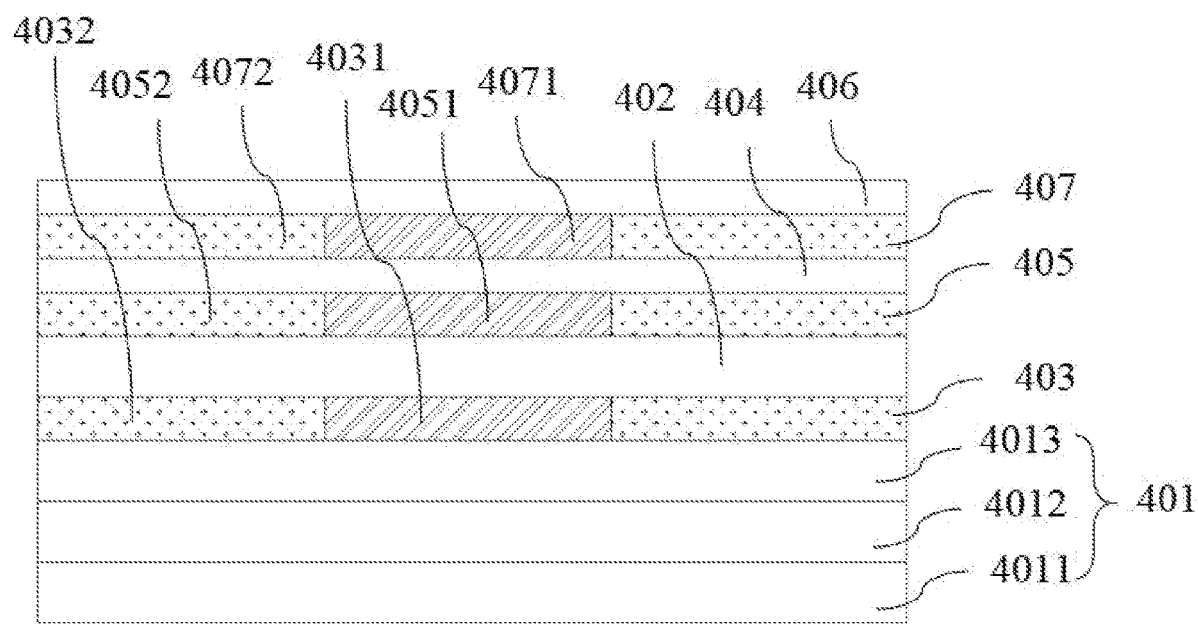
FIG. 4 is another basic structural diagram of the flexible display device provided by an embodiment of the present application.

Please refer to FIG. 4, which is another basic structural diagram of the flexible display device provided by an embodiment of the present application. Components of the present application and relative positional relationships between the components can be seen intuitively from the drawing. The flexible display device includes a display panel 401, a touch panel 402, a polarizer 404, and a cover plate 406. The touch panel 402 is disposed on the display panel 401 and is connected to the display panel 401 by a first optical adhesive layer 403. The polarizer 404 is disposed on the touch panel 402 and is connected to the touch panel 402 by a second optical adhesive 405. The cover plate 406 is disposed on the polarizer 404 and is connected to the polarizer 404 by a third optical adhesive 407. The first optical adhesive layer 403, the second optical adhesive layer 405, and the third optical adhesive layer 407 all includes an uncured optical adhesive in a bending region and a cured optical adhesive in a non-bending region.

Specifically, material of the uncured optical adhesive includes poly(methyl methacrylate). The uncured optical adhesive does not generate gas during an attaching process, is easy to be cut, and has good bending resistance, which not only satisfies bending performance of a flexible product but also achieves high strength of the bending region of the flexible product. Material of the cured optical adhesive includes epoxy acrylate. The cured optical adhesive has good adhesion and fluidity, which not only satisfies adhesion performance of an entire surface of the flexible product but also achieves adhesion stability of the non-bending region of the flexible product.

In an embodiment, a width of an uncured optical adhesive 4031 of the first optical adhesive layer 403 is equal to a width of an uncured optical adhesive 4051 of the second optical adhesive layer 405 and a width of an uncured optical adhesive 4071 of the third optical adhesive layer 407. A width of a cured optical adhesive 4032 of the first optical adhesive layer 403 is equal to a width of a cured optical adhesive 4052 of the second optical adhesive layer 405 and a width of a cured optical adhesive 4072 of the third optical adhesive layer 407.

It should be explained that the first optical adhesive layer 403, the second optical adhesive layer 405, and the third optical adhesive layer 407 may not all include: the uncured optical adhesive in the bending region and the cured optical adhesive in the non-bending region. It is possible that the first optical adhesive layer is the uncured optical adhesive in the bending region and is the cured optical adhesive in the non-bending region, and the second optical adhesive layer and the third optical adhesive layer are not limited; or the second optical adhesive layer is the uncured optical adhesive in the bending region and is the cured optical adhesive in the non-bending region, and the first optical adhesive layer and the third optical adhesive layer are not limited; or the first optical adhesive layer and the second optical adhesive layer both include the uncured optical adhesive in the bending region and is the cured optical adhesive in the non-bending region, and the third optical adhesive layer is not limited.

In an embodiment, thicknesses of the first optical adhesive layer 403, the second optical adhesive layer 405, and the third optical adhesive layer 407 range from 30 to 40 microns. The thicknesses of the first optical adhesive layer 403, the second optical adhesive layer 405, and the third optical adhesive layer 407 can be same or different.

In an embodiment, the display panel 401 includes a backplate 4011, a light-emitting layer 4012 disposed on the backplate 4011, and a thin film encapsulation layer 4013 disposed on the light-emitting layer 4012. The thin film encapsulation layer 4013 is connected to the touch panel 402 by the first optical adhesive layer 403.

An embodiment of the present application provides an assembling method of a flexible display module including the steps of:

First step: attaching one side of a first optical adhesive layer to a lower surface of a polarizer, and attaching another side of the first optical adhesive layer to a side of a touch layer. A bending region of the first optical adhesive layer corresponding to the flexible display module is an uncured optical adhesive. A non-bending region of the first optical adhesive layer corresponding to the flexible display module is a cured optical adhesive.

Second step: curing the non-bending region of the first optical adhesive layer by ultraviolet light. A curing temperature is 50 degrees Celsius, a pressure is 0.3 MPa, curing time is 5 minutes, and curing energy is 1 Joule per cubic centimeter.

Third step: attaching one side of a second optical adhesive layer to an upper surface of the polarizer, and attaching another side of the second optical adhesive layer to a side of a cover plate. A bending region of the second optical adhesive layer corresponding to the flexible display module is the uncured optical adhesive. A non-bending region of the second optical adhesive layer corresponding to the flexible display module is the cured optical adhesive.

Fourth step: curing the non-bending region of the second optical adhesive layer by the ultraviolet light. A curing temperature is 50 degrees Celsius, a pressure is 0.3 MPa, curing time is 5 minutes, and curing energy is 1 Joule per cubic centimeter.

Fifth step: curing the non-bending region of the flexible display module by the ultraviolet light. Curing time is 5 minutes and curing energy is 3 Joule per cubic centimeter.

In summary, the flexible display module provided by an embodiment of the present application features a full-surface optical adhesive layer design that provides the uncured optical adhesive in the bending region and the cured optical adhesive in the non-bending region. After the optical adhesives are attached, it satisfies not only the bending performance of the flexible display module, achieving high strength of the bending region but also the adhesion performance of the entire surface, achieving the adhesion stability of the non-bending region. The present application solves technical problems of polarizers of flexible display modules adopting the optical adhesives to adhere to other materials in the prior art. They have poor bending performance after curing when cured optical adhesives are adopted, and a poor adhesion when uncured optical adhesives are adopted.

Understandably, those having ordinary skills of the art may easily contemplate various changes and modifications of the technical solution and technical ideas of the present application and all these changes and modifications are considered within the protection scope of right for the present application.

What is claimed is:

1. A flexible display device, comprising:
   a touch panel;
   a polarizer disposed on the touch panel and connected to the touch panel by a first optical adhesive layer; and
   a cover plate disposed on the polarizer and connected to the polarizer by a second optical adhesive;
   wherein the first optical adhesive layer and the second optical adhesive layer both comprise an uncured optical adhesive in a bending region and a cured optical adhesive in a non-bending region; and
   wherein a width of the uncured optical adhesive of the first optical adhesive layer is less than a width of the uncured optical adhesive of the second optical adhesive layer.

2. The flexible display device as claimed in claim 1, wherein material of the uncured optical adhesive comprises poly(methyl methacrylate).

3. The flexible display device as claimed in claim 1, wherein material of the cured optical adhesive comprises epoxy acrylate.

4. The flexible display device as claimed in claim 1, wherein a thickness of the first optical adhesive layer ranges from 30 to 40 microns.

5. The flexible display device as claimed in claim 1, wherein a thickness of the second optical adhesive layer ranges from 30 to 40 microns.

6. The flexible display device as claimed in claim 5, wherein a thickness of the first optical adhesive layer is equal to the thickness of the second optical adhesive layer.

7. The flexible display device as claimed in claim 1, wherein the touch panel further comprises a display panel and a touch functional layer disposed on the display panel.

8. The flexible display device as claimed in claim 7, wherein the display panel is disposed on a side of the touch panel away from the polarizer, the display panel comprises a backplate, a light-emitting layer disposed on the backplate, and a thin film encapsulation layer disposed on the light-emitting layer, and the touch functional layer is connected to the thin film encapsulation layer.

* * * * *

UNITED STATES PATENT AND TRADEMARK OFFICE
CERTIFICATE OF CORRECTION

| | | |
|---|---|---|
| PATENT NO. | : 10,919,282 B1 | Page 1 of 1 |
| APPLICATION NO. | : 16/638764 | |
| DATED | : February 16, 2021 | |
| INVENTOR(S) | : Ming Xie | |

It is certified that error appears in the above-identified patent and that said Letters Patent is hereby corrected as shown below:

On the Title Page

Insert:
--(30) Foreign Application Priority Data:
August 15, 2019 (CN) 201910754463.X--

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*